(12) United States Patent
Dai Javad et al.

(10) Patent No.: US 10,506,517 B2
(45) Date of Patent: Dec. 10, 2019

(54) APPARATUS AND METHOD FOR ENABLING BROADCAST OF A WIRELESS SIGNAL WHEN SWITCHING OPERATION MODE

(71) Applicant: Huawei Technologies Co., Ltd., Shenzhen (CN)

(72) Inventors: Patrik Dai Javad, Kista (SE); Jacob Lerenius, Kista (SE); Hakan Lundqvist, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 160 days.

(21) Appl. No.: 15/533,301

(22) PCT Filed: Dec. 5, 2014

(86) PCT No.: PCT/EP2014/076691
§ 371 (c)(1),
(2) Date: Jun. 5, 2017

(87) PCT Pub. No.: WO2016/087003
PCT Pub. Date: Jun. 9, 2016

(65) Prior Publication Data
US 2018/0014253 A1    Jan. 11, 2018

(51) Int. Cl.
*H04W 52/02* (2009.01)
*H04W 4/02* (2018.01)
(Continued)

(52) U.S. Cl.
CPC ....... *H04W 52/0277* (2013.01); *H04W 4/023* (2013.01); *H04W 52/0229* (2013.01);
(Continued)

(58) Field of Classification Search
CPC ............. H04W 52/0277; H04W 4/023; H04W 52/0229; H04W 76/28; H04W 4/80;
(Continued)

(56) References Cited

U.S. PATENT DOCUMENTS

| 8,401,595 B2 | 3/2013 | Zhu et al. | |
| 2007/0135866 A1* | 6/2007 | Baker | A61B 5/0002 607/60 |

(Continued)

FOREIGN PATENT DOCUMENTS

| JP | H11289381 A | 10/1999 |
| JP | 2006304175 A | 11/2006 |

(Continued)

OTHER PUBLICATIONS

Apple, 'iPhone User Guide for iOS 6', 2013, pp. 1, 8, 34, 130, 156. (Year: 2013).*

(Continued)

*Primary Examiner* — Melvin C Marcelo
(74) *Attorney, Agent, or Firm* — Conley Rose, P.C.

(57) ABSTRACT

An apparatus configured to broadcast a wireless signal when a processing circuitry of the apparatus is in a non-active state. The broadcasted signals can be used to localize the apparatus when the apparatus is lost. The apparatus has a first processing circuitry configured to operate in an active power consuming mode and a non-active low power consuming mode. The apparatus further has a wireless transmit circuitry configured to be in an active mode and broadcast a wireless signal when the first processing circuitry switches operation mode from the active mode to the non-active mode. The first processing circuitry is powered by a battery supply, and the first processing circuitry may be configured to automatically switch from the active mode to the non-active mode when the supply voltage provided by the battery (Continued)

supply decreases below a threshold voltage, whereby the wireless circuitry will be broadcasting.

20 Claims, 5 Drawing Sheets

(51) Int. Cl.
    *H04W 76/28*     (2018.01)
    *H04W 8/00*     (2009.01)
    *H04W 4/80*     (2018.01)

(52) U.S. Cl.
    CPC .............. *H04W 4/80* (2018.02); *H04W 8/005* (2013.01); *H04W 76/28* (2018.02); *Y02D 70/142* (2018.01); *Y02D 70/144* (2018.01); *Y02D 70/162* (2018.01); *Y02D 70/164* (2018.01); *Y02D 70/21* (2018.01)

(58) Field of Classification Search
    CPC ..... H04W 8/005; Y02D 70/142; Y02D 70/21; Y02D 70/144; Y02D 70/164; Y02D 70/162
    See application file for complete search history.

(56) References Cited

U.S. PATENT DOCUMENTS

| | | | |
|---|---|---|---|
| 2008/0058883 | A1* | 3/2008 | Gautier ................ G06F 1/3203 607/29 |
| 2009/0280826 | A1 | 11/2009 | Malik et al. |
| 2010/0142509 | A1 | 6/2010 | Zhu et al. |
| 2011/0151943 | A1 | 6/2011 | Lee |
| 2013/0090110 | A1 | 4/2013 | Cloonan et al. |
| 2013/0109323 | A1 | 5/2013 | Ruutu et al. |
| 2013/0150077 | A1 | 6/2013 | Hiroki |

FOREIGN PATENT DOCUMENTS

| | | |
|---|---|---|
| JP | 2007235653 A | 9/2007 |
| JP | 2012070020 A | 4/2012 |
| JP | 2013122674 A | 6/2013 |
| KR | 20130017435 A | 2/2013 |
| KR | 20140089912 A | 7/2014 |

OTHER PUBLICATIONS

Machine Translation and Abstract of Japanese Publication No. JP2012070020, Apr. 5, 2012, 8 pages.
Machine Translation and Abstract of Korean Publication No. KR20130017435, Feb. 20, 2013, 11 pages.
Machine Translation and Abstract of Korean Publication No. KR20140089912, Jul. 16, 2014, 13 pages.
Foreign Communication From a Counterpart Application, Korean Application No. 10-2017-7018164, Korean Office Action dated May 18, 2018, 5 pages.
Foreign Communication From a Counterpart Application, Korean Application No. 10-2017-7018164, English Translation of Korean Office Action dated May 18, 2018, 4 pages.
Machine Translation and Abstract of Japanese Publication No. JP2006304175, Nov. 2, 2006, 24 pages.
Foreign Communication From a Counterpart Application, Chinese Application No. 2014800658033, Chinese Search Report dated Sep. 20, 2018, 2 pages.
Foreign Communication From a Counterpart Application, Chinese Application No. 2014800658033, Chinese Office Action dated Sep. 30, 2018, 6 pages.
Foreign Communication From a Counterpart Application, Japanese Application No. 2017-530075, Japanese Office Action dated Sep. 18, 2018, 4 pages.
Foreign Communication From a Counterpart Application, Japanese Application No. 2017-530075, Japanese Office Action dated Sep. 18, 2018, 7 pages.
Foreign Communication From a Counterpart Application, PCT Application No. PCT/EP2014076691, English Translation of International Search Report dated Aug. 3, 2015, 5 pages.
Foreign Communication From a Counterpart Application, Korean Application No. 10-2017-7018164, English Translation of Korean Office Action dated May 29, 2019, 5 pages.
Machine Translation and Abstract of Japanese Publication No. JP2007235653, Sep. 13, 2007, 19 pages.
Machine Translation and Abstract of Japanese Publication No. JPH11289381, Oct. 19, 1999, 18 pages.
Foreign Communication From a Counterpart Application, Japanese Application No. 2017-530075, Japanese Notice of Allowance dated Jun. 4, 2019, 2 pages.
"iPhone User Guide, For iOS 6.1 Software," Apple, 2013, 156 pages.
Foreign Communication From A Counterpart Application, Korean Application No. 10-2017-7018164, Korean Office Action dated May 29, 2019, 5 pages.
Foreign Communication From A Counterpart Application, Korean Application No. 10-2017-7018164, English Translation of Korean Office Action dated May 29, 2019, 3 pages.

* cited by examiner

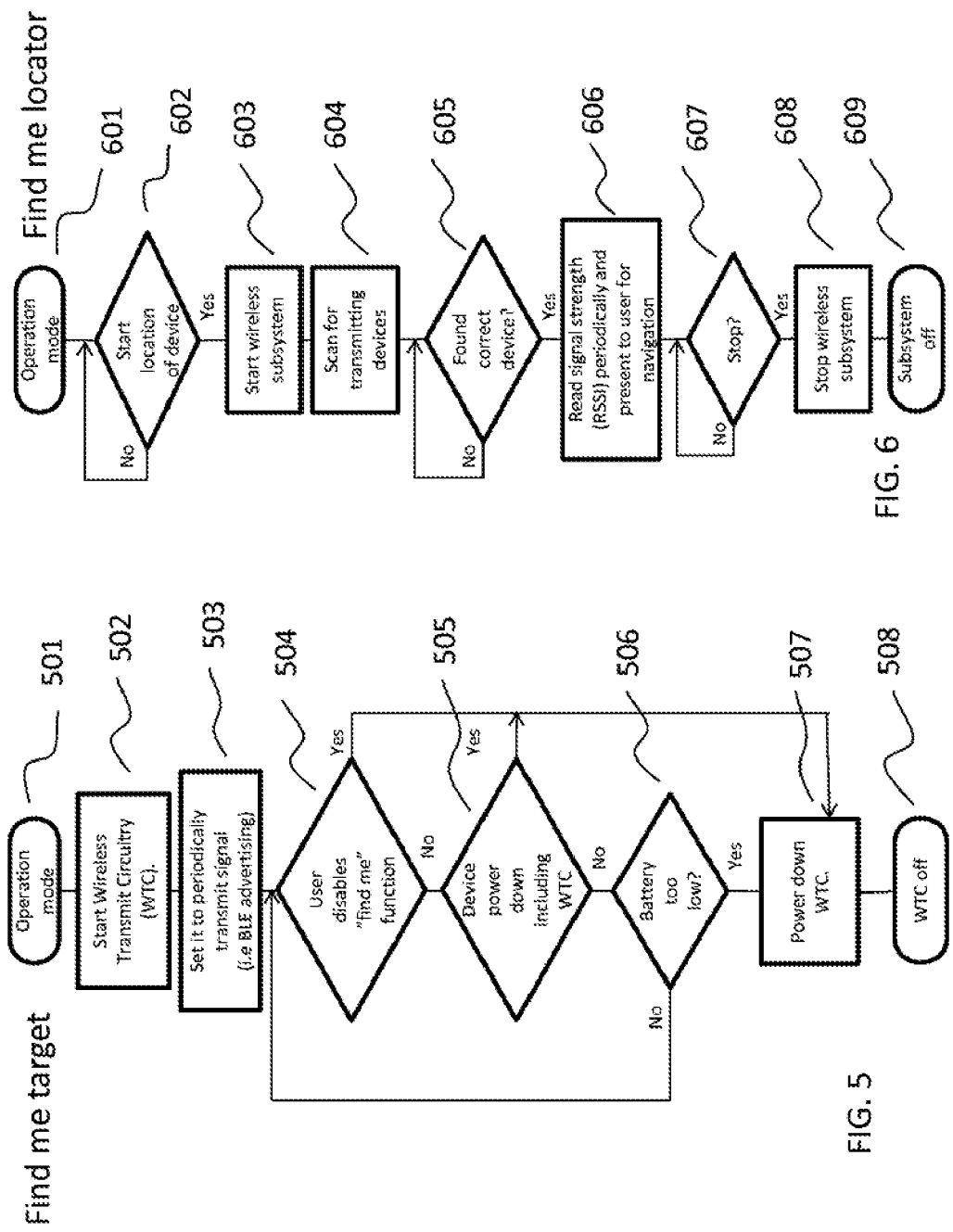

APPARATUS AND METHOD FOR ENABLING BROADCAST OF A WIRELESS SIGNAL WHEN SWITCHING OPERATION MODE

CROSS-REFERENCE TO RELATED APPLICATION

This application is a U.S. National Stage of International Patent Application No. PCT/EP2014/076691 filed on Dec. 5, 2014, which is hereby incorporated by reference in its entirety.

TECHNICAL FIELD

The present disclosure relates to the field of enabling broadcast of a wireless signal when turning operation mode of a battery powered apparatus into a non-active low power consuming mode. The broadcasted signal may be used for localizing the apparatus, if the apparatus is lost.

BACKGROUND

A common problem for owners of mobile phone devices is that sometimes the phone is temporary lost, e.g. the user forgot where he/she (or any of the other family member) last put the phone in a home environment. One frequently used method to find such lost mobile phone device is simply to make a call and "follow the ring tones." If a phone is lost in a public environment (perhaps the owner knows or suspect that the mobile phone is stolen) there are methods to track and find such mobile phone devices, e.g. based on user installed security application.

One problem is that since mobile devices are usually battery powered, the above mentioned methods are applicable only as long as the phone is powered on. If the phone is switched off due to low battery, or if the phone is manually turned off by any reason, then the phone cannot easily be found.

SUMMARY

It is an object of the present disclosure to provide a concept, which makes it possible to localize a battery powered mobile device, such as a mobile phone or a tablet, when such device is in a low power consuming mode or power off mode. Embodiments of the disclosure are based on battery powered devices including wireless connectivity technology.

The foregoing and other objects are achieved by the features of the independent claims. Further implementation forms are apparent from the dependent claims, the description and figures.

According to a first aspect, an apparatus comprising one or more power delivering units wherein at least a first one of the power delivering units comprises a first battery supply, first processing circuitry powered by the first battery supply, and configured to operate in several modes, including a first, active power consuming mode and a second, non-active low power consuming mode, and wireless transmit circuitry powered by at least one of said one or more power delivering units, and configured to be in an active broadcasting mode and broadcast a wireless signal when the first processing circuitry switches operation mode from the first active mode to the second non-active mode.

The wireless transmit circuitry, which can also be a wireless transceiver circuitry, can be a low power transmit or transceiver circuitry, which will draw a limited supply current, and the wireless transmit circuitry may be powered by a power delivering unit or battery supply having less supply energy than needed to power the first processing circuitry. Thus, when the first processing circuitry is in a non-active low power consuming mode, the wireless transmit circuitry may be held in the active broadcasting mode. The broadcasted signals can be used to localize the apparatus, if the apparatus is lost, even if the apparatus is powered off from normal operating mode.

In a first possible implementation form of the apparatus according to the first aspect, the transmit circuitry is configured to be in the active, broadcasting mode when the first processing circuitry is in the first active operation mode.

In a second possible implementation form of the apparatus according to the first aspect, the transmit circuitry is configured to be in a non-active, non-broadcasting mode when the first processing circuitry is in the first active operation mode.

In a third possible implementation form of the apparatus according to the first aspect as such or according to any of the preceding implementation forms of the first aspect, the first processing circuitry is configured to manage switching from one operation mode to another operation mode based on one or more user selected settings or one or more user selected inputs. Such user selected input may be, for example, a shutdown command or normal power off command or a switch operation mode command.

In a fourth possible implementation form of the apparatus according to the first aspect as such or according to any of the preceding implementation forms of the first aspect, the first processing circuitry is configured to automatically switch from the first active mode to the second non-active mode when the supply voltage provided by the first battery supply to the first processing circuitry decreases below a first threshold voltage. The first threshold voltage can be, for example, a voltages below which a full operation of the processing circuitry is not possible anymore.

In a fifth possible implementation form of the apparatus according to the first aspect as such or according to any of the preceding implementation forms of the first aspect, the first processing circuitry is configured to switch operation mode from the first active mode to the second non-active mode when receiving one or more predefined first user inputs.

In a sixth possible implementation form of the apparatus according to the first aspect as such or according to any of the preceding implementation forms of the first aspect, the transmit circuitry is powered by the first battery supply, and the transmit circuitry is configured to be in a non-active, non-broadcasting mode when the supply voltage of the first battery is below a predetermined second threshold voltage.

In a seventh possible implementation form of the apparatus according to the fourth and the sixth implementation form of the first aspect, the first threshold voltage is higher than the second threshold voltage. Therefore, according to this implementation form, the transmit circuitry remains switched on longer than the processing circuitry. Thereby it is enabled that the apparatus can still be found based on the broadcasted signal although the remaining functions of the apparatus (e.g. the ones performed by the processing circuitry) are already switched off due to a low supply voltage of the first battery.

In an eighth possible implementation form of the apparatus according to the first aspect as such or according to any of the preceding implementation forms of the first aspect, the apparatus further comprises a second power delivering unit, and the transmit circuitry is powered by the second power delivering unit. By having the second power delivery circuit (e.g. in form of a second (long life) battery) it can be ensured that even when the first battery is completely empty, the wireless transmit circuitry is able to broadcast the wireless signal and the apparatus can still be easily found based on the broadcasted wireless signal. According to a further implementation form, the transmit circuitry can be powered by both the first power delivering unit and the second power delivering unit. For example, when the supply voltage of the first battery falls below a predetermined threshold (such as the above mentioned second threshold) the transmit circuitry can switch its power supply from the first power delivery unit to the second power delivery unit. Hence, the second power delivery unit may function as a backup solution further extending the time the apparatus can broadcast the wireless signal.

In a ninth possible implementation form of the apparatus according to the first aspect as such or according to any of the preceding implementation forms of the first aspect, the operation modes of the first processing circuitry and the transmit circuitry comprise a common power off mode in which the first processing circuitry is in a non-active, low power consuming mode, and in which the transmit circuitry is in a non-active, non-broadcasting mode. This common-power mode can be, for example, a flight mode (all wireless communications functions are deactivated) or a full shut down or a full power off mode.

In a tenth possible implementation form of the apparatus according to the fifth and the ninth implementation form of the first aspect, the first processing circuitry and the transmit circuitry are configured to be set into the common power off mode when the first processing circuitry receives a second user input being different to the first user input. The second user input can be, for example, an "enter flight mode" or a "shut down apparatus complete" command.

In an eleventh possible implementation form of the apparatus according to the fifth and the ninth or the fifth and the tenth implementation form of the first aspect, when the first processing circuitry detects a first user setting, the first processing circuitry is configured to switch from the first active mode to the second non-active mode when receiving the first user input or when the supply voltage provided by the first battery supply decreases below the first threshold voltage, and when the first processing circuitry detects a second user setting, the first processing circuitry and the transmit circuitry are configured to be set into the common power off mode when the first processing circuitry receives the first user input or when the supply voltage provided by the first battery supply decreases below the first threshold voltage.

In a twelfth possible implementation form of the apparatus according to the first aspect as such or according to any of the preceding implementation forms of the first aspect, the transmit circuitry comprises a BLUETOOTH low energy transmitter, the wireless signal is a BLUETOOTH low energy signal.

The broadcasted signal may be broadcasted on a periodic basis. When the transmit circuitry is transmitting a BLUETOOTH low energy signal, the transmitted signal may be detected by another apparatus, such as a mobile device or phone, which is provided with a wireless subsystem for reading the signal strength of the broadcasted signal. Such a wireless subsystem may be based on BLUETOOTH technology and may comprise a BLUETOOTH Read Signal Strength Indicator (RSSI).

According to a second aspect, a method for switching operation modes in an apparatus comprising switching an operation mode of a first processing circuit of the apparatus from a first active power consuming mode to a non-active low power consuming mode and in response to switching of the operation mode of the first processing circuit maintaining or starting broadcasting of a wireless signal.

According to a third aspect, a method for switching operation modes in an apparatus comprising one or more power delivering units with a first power delivering unit holding a first battery supply, the apparatus further comprising first processing circuitry powered by the first battery supply, the first processing circuitry being configured to operate in several modes, including a first, active power consuming mode and a second, non-active low power consuming mode, and the apparatus further comprising wireless transmit circuitry powered by at least one of the one or more power delivering units and configured to be in an active broadcasting mode and broadcast a wireless signal when the first processing circuitry switches operation mode from the first active mode to the second non-active mode, the method comprising detecting a supply voltage of the first battery, and switching operation mode of the first processing circuitry from the first active mode to the second non-active mode when the supply voltage provided by the first battery supply to the first processing circuitry decreases below a first threshold value, or when the first processing circuitry receives one or more first user inputs, whereby the wireless transmit circuitry is in the active broadcasting mode.

In a first possible implementation form of the method according to the third aspect, the wireless transmit circuitry is powered by the first battery supply, and the method further comprises switching operation mode of the wireless transmit circuitry from the active broadcasting mode to a non-active, non-broadcasting mode when the first battery supply voltage decreases below a second threshold value being lower than the first threshold voltage.

According to a fourth aspect, a computer program comprising a program code for performing the method according to the second or third aspect or according to the first possible implementation form of the method according to the third aspect, when the computer program runs on a computer.

BRIEF DESCRIPTION OF THE DRAWINGS

FIG. 5 is a flow chart illustrating broadcast of wireless localization signals by the apparatus of FIG. 2 according to an embodiment of the disclosure; and FIG. 6 is a flow chart illustrating scanning for wireless localization signals by the second mobile device of FIG. 1 according to an embodiment of the disclosure.

DETAILED DESCRIPTION OF EMBODIMENTS

It is within embodiments of the disclosure to propose a solution to solve the problem of finding a lost mobile device which is powered off or in a low power mode, i.e. a means to localize a lost mobile device even when the lost mobile device cannot be called (e.g. due to the fact that its receiving circuits are off or it even doesn't have such receiving circuits).

Figure 1:
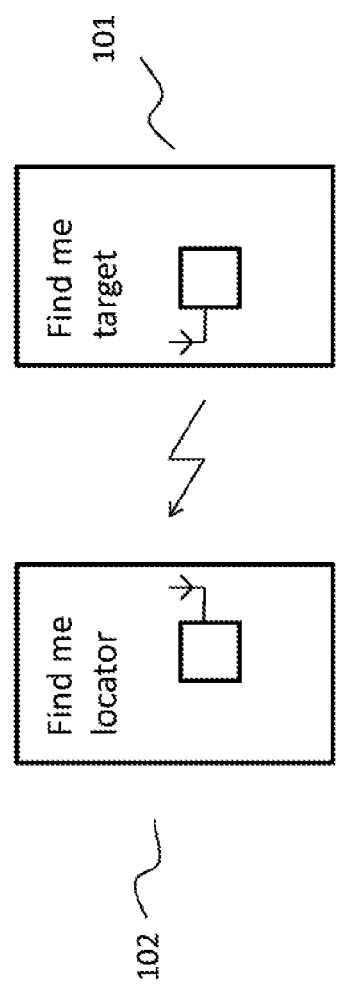
FIG. 1 is a diagram illustrating localization of a first battery powered mobile device by a second battery powered mobile device, where the first battery powered device is an example for an apparatus according to an embodiment of the disclosure.

FIG. 1 is a diagram illustrating localization of a first battery powered mobile device designated as 'Find me target' 101 by a second battery powered mobile device designated as 'Find me locator' 102, where the first battery powered mobile device 101 is an apparatus according to an embodiment of the disclosure, which will be further described in the following.

A mobile device 101 could be found or positioned when powered off in a non-active low-power consuming mode, using a very low power wireless technology which can be used for positioning, e.g. based on BLUETOOTH Low Energy. The mobile device 101, when powered off from a user perspective, i.e. when powered off in a non-active low-power consuming mode, could on a periodic basis transmit or broadcast a radio signal, which can be tracked by other devices 102, for example another device based on BLUETOOTH Low Energy, which is scanning for signals in direction of the powered off and lost mobile device 101. Also such lost mobile device 101 could be localized by an indoor network positioning system, presumed the network positioning system is based on the same indoor positioning technology, e.g. BLUETOOTH Low Energy.

The wireless signal broadcasted by the mobile device 101 can also be designated as Beacon. The transmit circuitry of the mobile device 101 may be configured to include an identity information of the mobile device 101 into the broadcasted wireless signal. Furthermore the transmit circuitry of the mobile device 101 may be configured to include position information (e.g. Global Positioning System (GPS) coordinates) about a last known position of the mobile device 101 into the broadcasted wireless signal.

A number of wireless transmit technology solutions may be used for broadcasting a wireless transmit signal when the mobile device 101 is in a non-active low-power consuming mode. The wireless transmit circuitry may include low power or low energy transmit technology solutions or radio solutions such as BLUETOOTH Low Energy, ANT/ANT+, Dynamic Adaptive Streaming over HTTP 7 (DASH7), iBeacon (APPLE Incorporated trademark for their own implementation on top of BLUETOOTH Low Energy), ZIGBEE, and Z-WAVE.

The wireless transmit circuitry or low power wireless technology, e.g. BLUETOOTH Low Energy, could be powered by different means, for example by the small amount of energy remaining in the battery used for powering the mobile device 101, i.e. the remaining battery capacity after the mobile device 101 has been automatically switched off due to low battery. The wireless transmit circuitry or low power wireless technology could also be powered by an alternative power source, e.g. by another battery or by a solar cell. Some critical factors for low power wireless transmit solutions are very low average current consumption and very low peak current consumption.

For a mobile device, such as the mobile device 101, the battery status and capacity is typically continuously monitored, which may be by hardware and software, and at some point when remaining battery capacity is low the mobile device 101 is automatically turned off. Typically for a smart phone device using a Li-family type of battery, the nominal voltage of a battery is approximately 3.8 Volts (V) when fully charged, and when the battery voltage has decreased to approx. 3.2-3.4 V then the phone is shut off. At this point the remaining battery capacity is only in range of a few percent of the total battery capacity. As mentioned above, the remaining small capacity could be used by for some very low power consuming wireless technology for positioning a mobile phone when powered off.

Figure 2:
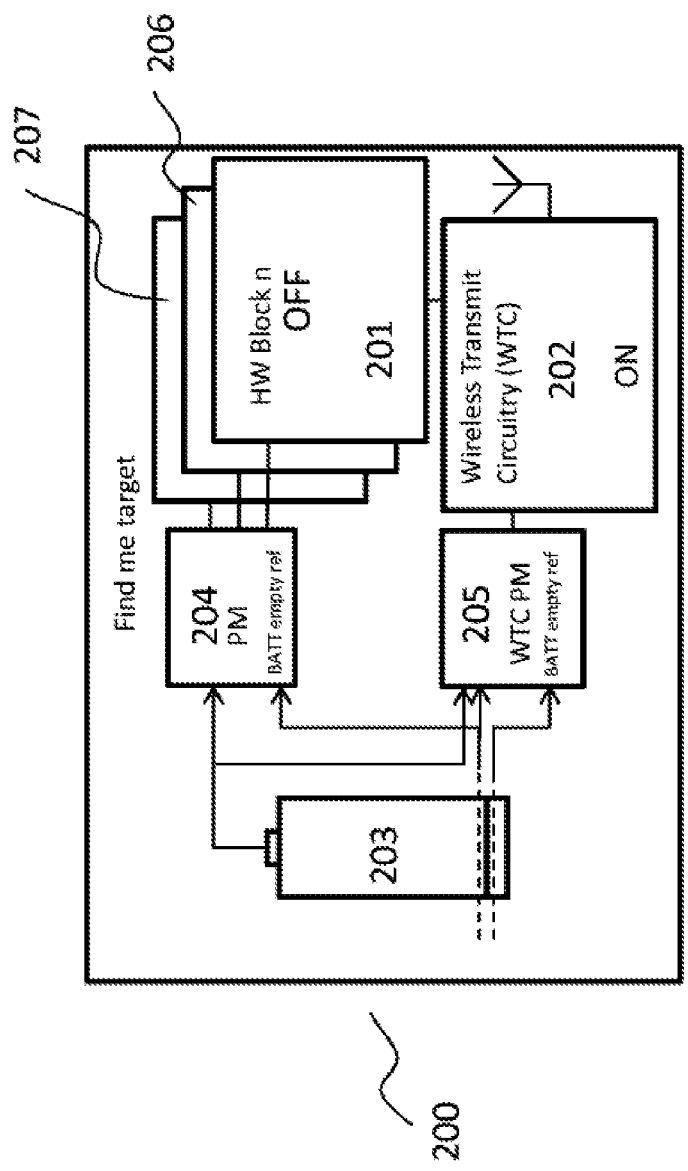
FIG. 2 is a block diagram of an apparatus according to an embodiment of the disclosure.

FIG. 2 is a block diagram of an apparatus 200 according to an embodiment of the disclosure. In an embodiment, the apparatus 200 may be a mobile device or a phone. The apparatus 200 can be used as the 'Find me target' mobile device 101 of FIG. 1. The apparatus 200 has a battery supply 203 as a power delivering unit, a first processing circuitry 201 powered by the battery supply 203, and a first power management circuit (PM) 204 connected between the battery supply 203 and the first processing circuitry 201. The apparatus 200 further comprises a wireless transmit circuitry (WTC) 202, which can also be a wireless transceiver circuitry. The WTC 202 is also powered by the battery supply 203 via a second PM 205 designated as WTC PM, connected between the battery 203 and the WTC 202. As can be seen from FIG. 2, the WTC PM 205 is configured to perform power management (exclusively) for the WTC 202. The PM 204, is configured to perform power management for the remaining processing circuitries of the apparatus 200.

The apparatus 200 may have other processing circuitries 206, 207 besides the first processing circuitry 201, where the processing circuitries 206, 207 are also powered by the battery supply 203 via the PM 204. The first processing circuitry 201 may also be communicatively connected to the WTC 202. The PMs 204 and 205 are both connected to the battery supply 203 and configured to detect when the supply voltage of the battery supply 203 decreases below a first threshold voltage, which is indicated by "BATT empty ref" for both the PM 204 and the WTC PM 205. Furthermore, the WTC PM 205 is further configured to detect when the supply voltage of the battery supply 203 decreases below a second threshold voltage which is even below above mentioned first threshold voltage.

Figure 3:
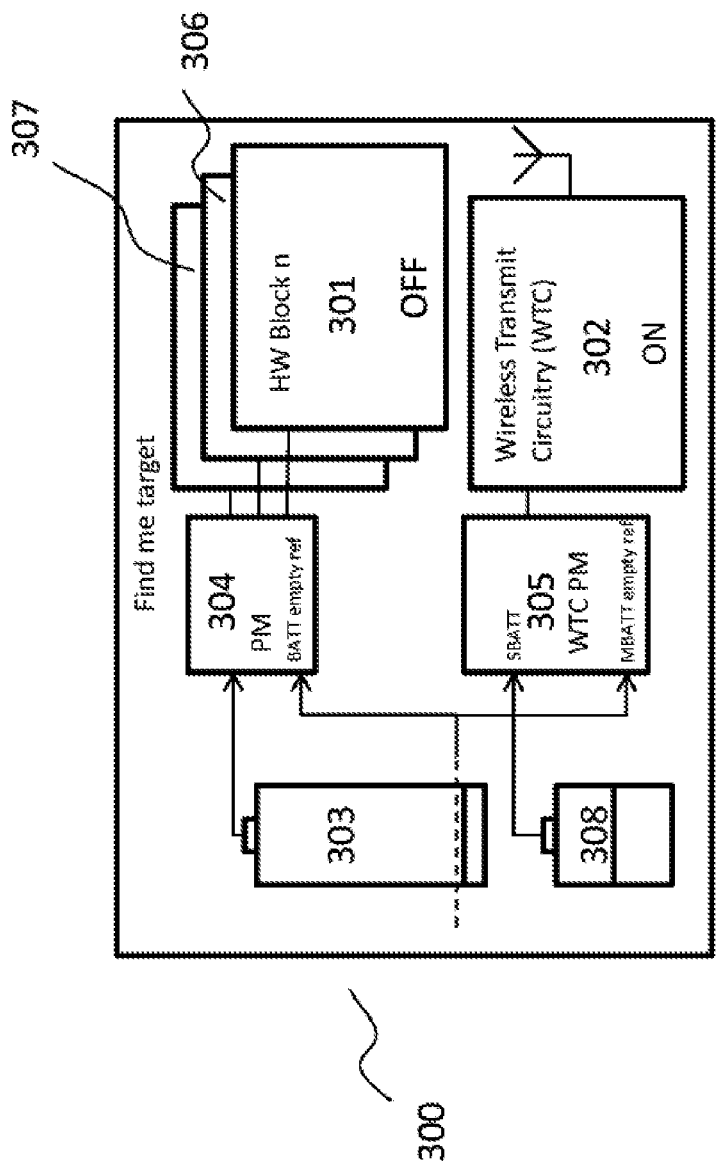
FIG. 3 is a block diagram of an apparatus according to an embodiment of the disclosure.

FIG. 3 is a block diagram of an apparatus 300 according to a further embodiment of the disclosure. In another embodiment, the apparatus 300 may be a mobile device or a phone. The apparatus 300 can also be used as the 'Find me target' device 101 of FIG. 1. The apparatus 300 is configured very similar to the apparatus 200 of FIG. 2. The apparatus 300 has a first battery supply 303 as a first power delivering unit, a first processing circuitry 301 powered by the first battery supply 303, and a PM 304 connected between the first battery 303 and the first processing circuitry 301. The apparatus 300 may also have other processing circuitries 306, 307 besides the first processing circuitry 301, where the processing circuitries 306, 307 are also powered by the first battery supply 303 via the PM 304. The apparatus 300 also comprises a wireless transmit circuitry (WTC) 302, which can also be a wireless transceiver circuitry, but the WTC 302 is not powered by the first battery supply 303.

Instead the WTC 302 is powered by a second power delivering unit 308. Here the second power delivering unit 308 is a second battery supply, but in a further embodiment could also be a solar cell. A WTC PM 305 is connected between the second power delivering unit 308 and the WTC 302. The WTC PM 305 may in some embodiments also be connected to the first battery supply 303, whereby the supply of power from the second power delivering unit 308 to the WTC 302 may also be controlled as a function of the voltage of the first battery supply 303. For the apparatus 300 illustrated in FIG. 3, the PMs 304 and 305 are both connected to the battery supply 303 and configured to detect when the supply voltage of the battery supply 303 decreases below a first threshold voltage, which is indicated by "BATT empty ref" for the PM 304 and by "MBATT empty ref" for the WTC PM 305. The first processing circuitry 301 may also be communicatively connected to the WTC 302.

According to a further embodiment it is also possible that the WTC 302 is powered by both the first battery supply 303 and the second power delivering unit 308. As an example, as long as the supply voltage of the first battery supply 303 is above a given threshold (e.g. the above mentioned second threshold), the second WTC PM 305 is configured to provide the WTC 302 with power from the first battery supply 303. When the supply voltage of the first battery supply 303 decreases below the mentioned second threshold, the WTC PM 305 can be configured to switch the power supply of the WTC 302 from the first battery supply 303 to the second power delivering unit 308. In this embodiment, the second power delivering unit 308 acts as a backup solution further extending the time during which the WTC 302 can broadcast above mentioned wireless signal.

For each of the apparatuses 200 and 300, the processing circuitry 201, 301 or circuitries 201, 301, 206, 306, 207, 307—in the case where the apparatus 200, 300 have several processing circuitries—may be configured to perform the normal operating functions of the apparatus 200, 300, such as mobile phone operation functions. The WTC 202, 302 is configured as a low or very low energy wireless transmitter, and it is preferred that the WTC 202, 302 is configured as BLUETOOTH low energy transmitter, which will broadcast a BLUETOOTH low energy signal when active in transmitting. The first processing circuitry 201, 301 is configured to operate in several modes, including a first, active power consuming mode and a second, non-active low power consuming mode, and the WTC 202, 302 is configured to be in an active broadcasting mode and broadcast a wireless signal when the first processing circuitry 201, 301 switches operation mode from the first active mode to the second non-active mode.

When in the first, active power consuming mode, the first processing circuitry 201, 301 may be in a normal operation mode performing the normal operation functions, such as mobile phone operations. When in the second, non-active low-power consuming mode, the first processing circuitry 201, 301 may be in a powered off mode, when seen from a user perspective, where the power consumption of the first processing circuitry 201, 301 is very low.

It is within embodiments of the present disclosure that the wireless transmit circuitry 202, 302 is configured to be in the active, broadcasting mode when the first processing circuitry 201, 301 is in the first active operation mode. In this case, when the first processing circuitry 201, 301 switches from the first operation mode to the second operation mode, the WTC 202, 302 need not change operation mode, and the transmit circuitry 202, 302 will keep on broadcasting a wireless signal when the first processing circuitry 201, 301 has changed to the second operation mode.

According to further embodiments, the WTC 202, 302 is configured to be in a non-active, non-broadcasting mode when the first processing circuitry 201, 301 is in the first active operation mode. In this case, when the first processing circuitry 201, 301 switches from the first operation mode to the second operation mode, the WTC 202, 302 has to change operation mode from the non-active mode to the active broadcasting mode when the first processing circuitry 201, 301 is changing from the first to the second operation mode.

Any change of operation mode of the first processing circuitry 201, 301 may be communicated by the first processing circuitry 201, 301 to the WTC 202, 302.

The change of operation mode of the first processing circuitry can be initiated in different ways. For the apparatuses 200, 300 the first processing circuitry 201, 301 is configured to manage switching from one operation mode to another operation mode based on one or more user selected settings and/or one or more user selected inputs. Here, the first processing circuitry 201, 301 is configured to switch operation mode from the first active mode to the second non-active mode when receiving one or more predefined first user inputs. Such user inputs may be activation of a 'Normal power off' signal, which will bring the first processing circuitry 201, 301 in the second mode, which may be a powered off mode seen from a user perspective, where the power consumption of the first processing circuitry 201, 301 is very low. This change of operation mode of the first processing circuitry 201, 301 is communicated by the first processing circuitry 201, 301 to the WTC 202, 302. Based on the configuration of the WTC 202, 302, the WTC 202, 302 then determines if it has to change from the non-active mode to the active broadcasting mode, or if it maintains being in the active broadcasting mode.

The PM 204, 304 monitors the supply voltage delivered by the first battery supply 203, 303 to the first processing circuitry 201, 301, and the first processing circuitry 201, 301 is configured to automatically switch from the first active mode to the second non-active mode when the supply voltage provided by the first battery supply 203, 303 decreases below a first threshold voltage. This change of operation mode of the first processing circuitry 201, 301 may be communicated by the first processing circuitry 201, 301 to the WTC 202, 302. However, the WTC PM 205, 305 connected to the WTC 202, 302 may also be monitoring the supply voltage delivered by the first battery supply 203, 303 to the first processing circuitry 201, 301, whereby the WTC 202, 302 can be informed if the supply voltage provided by the first battery supply 203, 303 decreases below the first threshold voltage, thereby initiating change of operation mode of the first processing circuitry 201, 301. Based on the configuration of the WTC 202, 302, the WTC 202, 302 then determines if it has to change from the non-active mode to the active broadcasting mode, or if it maintains being in the active broadcasting mode when the supply voltage of the first battery supply 203, 303 decreases below the first threshold voltage.

For the apparatus 200 of FIG. 2, where the WTC 202 is powered by the first battery supply 203, the WTC 202 is configured to be in a non-active, non-broadcasting mode when the supply voltage of the first battery supply 203 is below a predetermined second threshold voltage. The first threshold voltage is higher than the second threshold voltage. Thus, when the supply voltage of the first battery supply 203 decreases below the second threshold voltage, the WTC 202 changes operation mode from the active, broadcasting mode to the non-active, non-broadcasting mode. The values of the first and second threshold voltages depend on the technology used for the first battery 203. For a Li-ion type battery the first threshold voltage could be in the range of 3.2-3.4 V, where it is preferred that the first threshold voltage is 3.2 V, and it is preferred that the second threshold voltage is 3 V or in the range of 2.8-3 V. By having this functionality a depth discharge of the first battery supply 203 and therefore a degradation of the first battery supply 203 can be avoided.

According to further embodiments, the first processing circuitry 201, 301 and the WTC 202, 302 are configurable to operate in a common power off mode wherein the first processing circuitry 201, 301 is in a non-active, low power consuming mode, and wherein the WTC 202, 302 is in a non-active, non-broadcasting mode. The first processing circuitry 201, 301 and the WTC 202, 302 may both be configured to be set into the common power off mode when the first processing circuitry 201, 301 receives one or more user inputs, such as a second or a third user input, being different to the first user input. Here, the non-active, low power consuming mode for the first processing circuitry 201 may correspond to the non-active mode of the second operation mode, and the non-active mode of the transmit circuitry 202 may correspond to the non-active mode when the first battery supply 203 supply voltage is below the second threshold voltage.

As described above, the first processing circuitry 201, 301 can be configured to manage switching from the first operation mode to the second operation or to the common power off mode based on different user inputs. However, the first processing circuitry 201, 301 can also be pre-configured by different user selected settings, whereby the same user input can result in different changes of operation modes dependent on the pre-configuration.

It is within embodiments of the disclosure that the first processing circuitry 201, 301, when being pre-configured by or detecting a first user setting, is configured to switch from the first active mode to the second non-active mode when receiving the first user input or when the supply voltage provided by the first battery supply 203, 303 decreases below the first threshold voltage. Furthermore, when the first processing circuitry 201, 301 is pre-configured by or detects a second user setting, the first processing circuitry 201, 301 and the WTC 202, 302 are configured to be set into the common power off mode when the first processing circuitry 201, 301 receives the first user input or when the supply voltage provided by the first battery supply 203, 303 decreases below the first threshold voltage.

Figure 4:
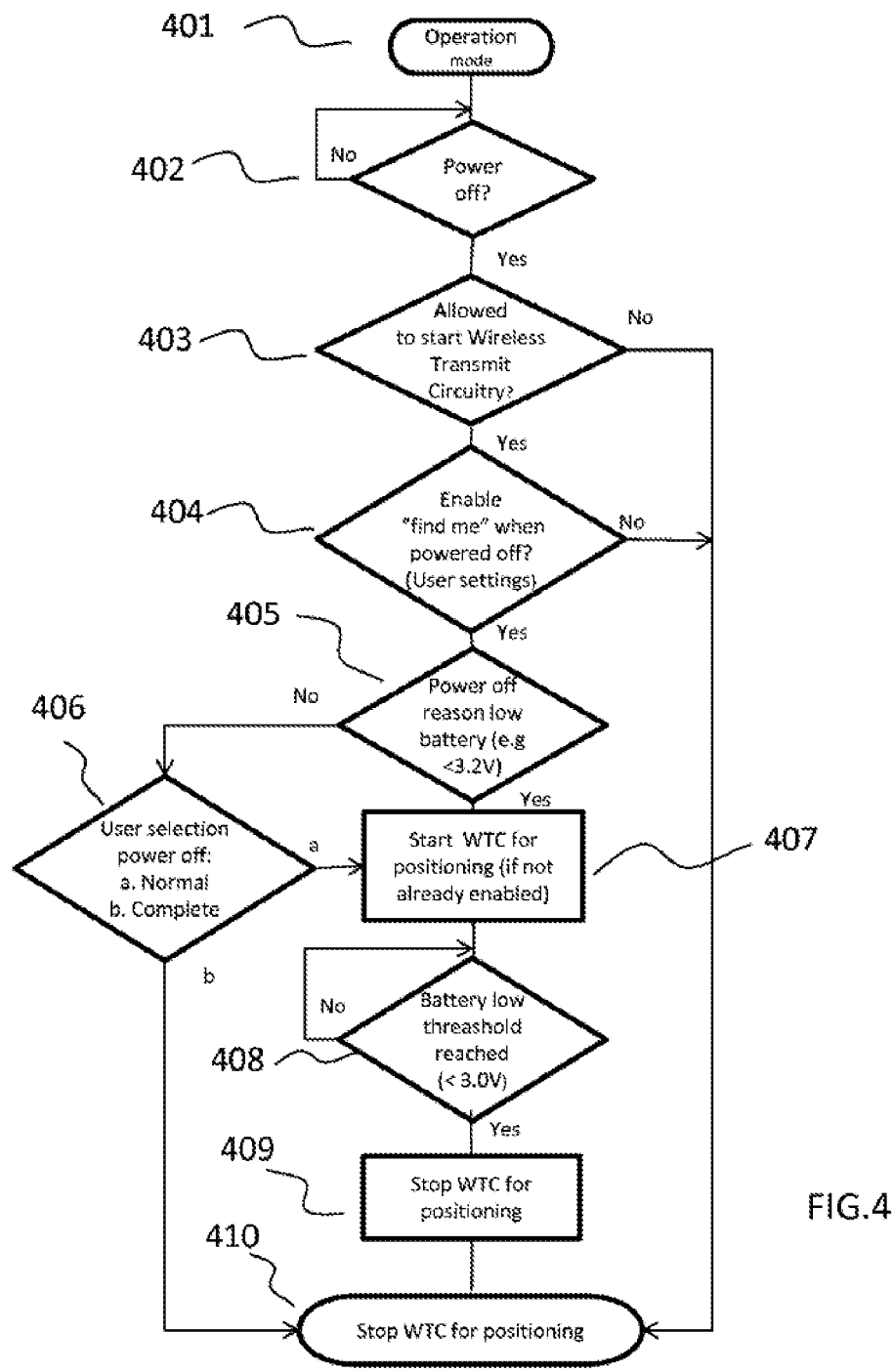
FIG. 4 is a flow chart illustrating operation modes for the apparatus of FIG. 2 according to an embodiment of the disclosure.

FIG. 4 is a flow chart illustrating operation modes during a power off process for the apparatus 200 of FIG. 2, for which both the first processing circuitry 201 and the WTC 202 are powered by the first battery supply 203. The apparatus 200 starts with the first processing circuitry 201 is in the normal operation mode in step 401, where the first processing circuitry detects if a 'Power off' signal is received in step 402. The 'Power off' signal can be initiated by different user inputs or by the battery supply voltage being below the first threshold voltage. In the normal operation mode the WTC 202 can be configured to be either in the active broadcasting mode or in the non-active, non-broadcasting mode.

If a 'Power off' signal is detected, then in step 403, the first processing circuitry 201, determines if the 'Power off' signal is initiated by a first user input, a second user input, a third user input, or by the first battery supply 203 being low. If the 'Power off' signal is initiated by the third user input, which could be a 'flight-mode' input, for which the WTC 202 is not allowed to be active broadcasting, the first processing circuitry 201 and the WTC 202 are switched into the common power off mode 410, where both the first processing circuitry 201 and the WTC 202 are in a non-active mode, where the WTC 202 has stopped transmitting signals, which can be used for localizing the apparatus 200. If the WTC 202 is active broadcasting when the first processing circuitry 201 is in the first active operation mode, then in step 410 the WTC 202 is turned into the non-active, non-broadcasting mode. If the 'Power off' signal is initiated by the first user input, the second user input, or by the first battery supply 203 being low, then for a first determination the WTC 202 is allowed to be active, and the process proceeds to step 404.

In step 404 the first processing circuitry 201 detects user settings for determining operation modes. If the first processing circuitry is pre-configured by a second user setting, 'Enable "find me" when powered off?—No', then the WTC 202 is not allowed to be active broadcasting, and the first processing circuitry 201 and the WTC 202 are switched into the common power off mode 410. If the first processing circuitry is pre-configured by the first user setting, 'Enable "find me" when powered off?—Yes', then for a second determination the WTC 202 is allowed to be active broadcasting, and the process proceeds to step 405.

In step 405 the first processing circuitry 201 detects if the 'Power off' signal is initiated by the first user input, the second user input, or by the first battery supply 203 being low. If the 'Power off' signal is not initiated from the battery supply 203 being low, then the process proceeds to step 406. If the 'Power off' signal is initiated from the battery supply 203 being low (e.g. the supply voltage decreased below the first threshold voltage), then the process proceeds to step 407.

In step 406 the first processing circuitry 201 determines if the 'Power off' signal is initiated by (a) the first user input or by (b) the second user input. If the 'Power off' signal is initiated by the first user input ((a) normal power off), then the process proceeds to step 407, and if the 'Power off' signal is initiated by the second user input ((b) complete power off), then the WTC 202 is not allowed to be active broadcasting, and the first processing circuitry 201 and the WTC 202 are switched into the common power off mode 410.

In step 407 the first processing circuitry 201 is switched into the second, non-active low power consuming mode, and the WTC 202 is switched into the active broadcasting mode or maintained in the active broadcasting mode if already in the active mode, and the process proceeds to step 408.

In step 408 the transmit circuitry detects if the supply voltage of the first battery supply 203 decreases below the second threshold voltage. As long as the battery supply voltage is above the second threshold voltage, the WTC 202 is maintained in the active, broadcasting mode, and when battery supply voltage is decreased below the second threshold voltage, the process proceeds to step 409.

In step 409 the WTC 202 is switched into the non-active, non-broadcasting mode, whereby both the first processing circuitry 201 and the WTC 202 are in a non-active mode or the common power of mode 410.

Low power wireless radio communication systems can be used for indoor positioning applications, and also for outdoor positioning applications, mainly in urban environments. Today there are a lot of research and development efforts ongoing in this field, and commercial deployments already exists, which is mainly WI-FI based indoor positioning systems. Also wireless technologies are further refined in terms of positioning accuracy and power consumption by additional use of sensors for hybrid positioning, e.g. compass, accelerometers, Gyros for dead reckoning applications, in combination with WI-FI and BLUETOOTH RSSI based positioning methods. Recent standardization activities imply that BLUETOOTH Low Energy is very well suited for such applications, especially when good accuracy is needed and low power consumption is important. In addition this technology is expected to be widely deployed on the market.

For embodiments of the present disclosure it is preferred to use a wireless transmit technology for the WTC 202, 302, which technology provides high accuracy indoor positioning (HAIP) and low power consumption. Here, the BLUETOOTH Low Energy technology can be used. It is also important that the low power wireless technology used has a high penetration rate in mobile devices, which technologies today imply WI-FI or BLUETOOTH or possibly upcoming 5$^{th}$ generation (5G) based technologies suited for machine-to-machine (M2M)/Internet-Of-Things applications.

When using a positioning method being based on BLUETOOTH Low Energy technology, the principal operation can be based on Network Centric Use Case models (as per defined by In-Location-Alliance (ILA)) if a positioning system is used. A somewhat more simple method (e.g. based on RSSI) can be used if another mobile device 102 is used to find a lost and powered off mobile device 101.

In a Network centric positioning use case the device being tracked or localized is often referred as a "tag", which on periodic basis (e.g. 1 time per second) transmits a signal which can be received by locators. The signal from a tag could include data containing e.g. a device identifier number, a friendly name (such as e.g. Patrick's Phone) while a universally unique identifier (UUID) number is likely preferred due to security and privacy. While the tag is typically very low power consumption and low cost device, where a tag is commonly powered by a simple and cheap coin cell battery, the receiver or locator side is typically mains powered fixed installations. Locators would commonly be installed on ceilings. It is within embodiment of the present disclosure that a locator could also be a mobile device 102 such as a mobile phone which, with reasonable accuracy, could find the direction and the approximate distance to a tag, such as mobile device 101.

For embodiments of the present disclosure, a lost and powered off mobile device 101 could be viewed as a tag, transmitting a broadcast like signal on a periodic basis, so it could be localized by different methods, i.e. by an indoor, or outdoor when in urban environments, positioning system, or by other mobile devices 102 used as locators. Once a powered off mobile device 101 is "lost," and the 'Enable find me when powered off' function, see FIG. 4, is enabled, as in step 407 of FIG. 4, then such mobile device 101 could likely be found.

In a home environment, where no indoor positioning system may be available, another mobile device 102 could scan for any tags, including the lost mobile device 101 acting as a tag. In public environments, such as airports, train stations, shopping malls, and possibly in enterprise environments, indoor positioning systems could find or track such lost mobile device 101.

According to principles of the technical solution provided by embodiments of the present disclosure, then as part of a controlled power off procedure of a battery powered mobile device 101, apparatus 200, a low power wireless subsystem, such as the WTC 202 can be initialized for sending or broadcasting periodic signals such that another mobile device 102 can track it. The WTC 202 may be very low power consuming, and the remaining battery capacity of the first battery supply 203, which is powering the mobile device 101, apparatus 200, may be used for powering such positioning application for several days or weeks, before the battery supply voltage becomes so low that a "complete power off" is triggered (e.g. falls below the second the second threshold voltage). The signal broadcasting or tracking feature does not consume much energy, and this feature can therefore be also activated when the mobile device 101, apparatus 200 is powered on. Therefore, the user can use the same system for finding the lost mobile device 101, apparatus 200 independent of whether the mobile device 101, apparatus 200 is currently powered on or it is switched off.

In practical terms, this may imply that the WTC 202 includes functionality to power off by itself, for example based on the battery capacity or based on a limit for operating time. Here the battery level (the second threshold voltage) could be set to e.g. 3.0 V or the limit for operating time could be e.g. 1 week.

The possibility of finding a lost mobile device 101, apparatus 200 when powered off, may also be supported when a user manually powers off the mobile device 101, apparatus 200 and not only when the mobile device 101, apparatus 200 is powered off automatically due to low battery.

As already explained in the foregoing in conjunction with steps 403 and 404 of the method shown in FIG. 4, one or more user settings may be provided to enable/disable the broadcasting localization feature provided by the WTC 202, 302. If a mobile device 101, apparatus 200, apparatus 300, which is provided with the WTC 202, 302, is configured into flight mode then the broadcasting localization feature may be disabled (which can be based on local laws and regulations), i.e. the WTC 202, 302 used for positioning shall not be enabled.

As described in conjunction with step 406 of the method shown in FIG. 4, if the user settings are set to enable and activate the broadcasting apparatus 202, 303, then different user inputs may be used for powering off the apparatus 200, 300, where a first power off input may be a normal power of, where only the broadcasting wireless transmit circuitry 202, 303 is active, and a second power of input may be a complete system power off, where both the first processing circuitry 201, 301 and the broadcasting apparatus 202, 302 are non-active.

FIGS. 5 and 6 are flowcharts illustrating an example of the processes, which may be performed during a localization process of a lost mobile device 'Find me target' 101 by another mobile device 'Find me locator' 102. FIG. 5 illustrates broadcast of wireless localization signals by the mobile device 101, which is of the apparatus type 200 or 300 shown in FIG. 2 or FIG. 3. FIG. 6 illustrates scanning for the wireless localization signals by the second mobile device 102 of FIG. 1.

In step 501 the target mobile device 101, apparatus 200 is in a normal operation mode. In step 502 the low power WTC 202, 302 is activated, whereby the WTC 202, 302 starts broadcasting a wireless signal (also designated as a beacon). Activation of the WTC 202, 302 may be initiated by a user input for normal power off, as in step 406 of FIG. 4, or the battery supply voltage of the first battery 203, 303 being lower than the first threshold voltage, as in step 405 of FIG. 4. In step 503 the WTC 202, 203 is set to periodically transmit or broadcast a signal, such as 1 time per second. In case the WTC 202, 203 holds a BLUETOOTH Low Energy transmitter or transceiver, the broadcasted signal can be a BLUETOOTH Low Energy signal (designated as BLE advertising), which advertises the localization of the mobile device 101, apparatus 200, apparatus 300.

In step 504, if the person or user searching for the target mobile device 101, apparatus 200, apparatus 300 finds the mobile device 101, apparatus 200, apparatus 300 he or she may disable the 'find me' function, and the WTC 202, 203 is set in the non-broadcasting mode, step 508 'WTC off'. The user may also give a complete system power off input, in step 505 corresponding to step 406 of FIG. 4, which also sets the WTC 202, 203 in the non-broadcasting mode, step 508 'WTC off'. If not disabled by a user, the WTC 202, 203 goes on transmitting broadcast signals, until the supply voltage of the first battery supply 203 (for the apparatus 200) gets too low and below the second threshold voltage (for the apparatus 200) or the supply voltage of the second power delivering unit 308 falls below a certain threshold voltage (for the apparatus 300), steps 506 and 507 corresponding to steps 408 and 409 of FIG. 4, and the WTC 202, 302 is set in the non-broadcasting mode, step 508 'WTC off'. When the WTC 202 is turned off due to battery voltage being lower than the second threshold voltage, it is no longer possible to localize the mobile device 101 by use of another mobile device 102. However, according to one of the further embodiments described above, the lifetime of broadcasting of the wireless signal can be further extended by foreseeing the second power delivering unit 308 which can be used as a backup solution for powering the WTC 202, 302, when the supply voltage of the first battery supply 203, 303 falls below the second threshold voltage.

In step 601 the 'Find me locator' mobile device 102 is in a normal operation mode. The locator mobile device 102 is provided with a wireless subsystem comprising a BLUETOOTH RSSI, which gives a signal indicating the distance to a target mobile device 101, apparatus 200, apparatus 300 when the WTC 202, 302 is active broadcasting. In order to start searching for the location of the target mobile device 101, apparatus 200, apparatus 300 then the user starts the wireless subsystem with RSSI, in steps 602 and 603, and the locator mobile device 102 now goes on scanning for transmitted broadcast signals (Beacons) from the target mobile device 101, apparatus 200, apparatus 300, in step 604. When receiving a signal from the correct target mobile device 101, apparatus 200, apparatus 300, in step 605, the RSSI subsystem of the locator mobile device 102 reads the received signal strength periodically and presents the result to the user, who can use this result to localize the target mobile device 101, apparatus 200, apparatus 300, in step 606. When the user of the locator mobile device 102 has found the target mobile device 101, apparatus 200, apparatus 300, the user may stop the wireless RSSI subsystem, in steps 607, 608 and 609.

Although the present disclosure has been described with reference to specific features and embodiments thereof, it is evident that various modifications and embodiments can be made thereto without departing from the spirit and scope of the disclosure. The specification and drawings are, accordingly, to be regarded as an illustration of the disclosure as defined by the appended claims, and are contemplated to cover any and all modifications, variations, combinations or equivalents that fall within the scope of the present disclosure.

The term "comprising" as used in the appended claims does not exclude other elements or steps. The term "a" or "an" as used in the appended claims does not exclude a plurality.

Any method described herein and in the claims may be supplemented by any features of the apparatuses described herein and in the claims in terms of method features.

The invention claimed is:

1. An apparatus, comprising:
one or more power supplies, wherein at least one of the one or more power supplies comprises a first battery supply;
a first processing circuitry coupled to the first battery supply and powered by the first battery supply, wherein the first processing circuitry is configured to operate in several modes comprising a first active power consuming mode and a second non-active low power consuming mode; and
a wireless transmit circuitry coupled to and powered by the first battery supply, wherein the wireless transmit circuitry is configured to be in an active broadcasting mode and broadcast a wireless signal when the first processing circuitry switches operation mode from the first active power consuming mode to the second non-active low power consuming mode, and wherein the wireless transmit circuitry is further configured to be in a non-active non-broadcasting mode when a supply voltage of the first battery supply is below a first threshold voltage.

2. The apparatus of claim 1, wherein the wireless transmit circuitry is further configured to be in the active broadcasting mode when the first processing circuitry is in the first active power consuming mode.

3. The apparatus of claim 1, wherein the wireless transmit circuitry is further configured to be in the non-active non-broadcasting mode when the first processing circuitry is in the first active power consuming mode.

4. The apparatus of claim 1, wherein the first processing circuitry is further configured to manage switching from one operation mode to another operation mode based on one or more user selected settings.

5. The apparatus of claim 1, wherein the first processing circuitry is further configured to manage switching from one operation mode to another operation mode based on one or more user selected inputs.

6. The apparatus of claim 1, wherein the first processing circuitry is further configured to automatically switch from the first active power consuming mode to the second non-active low power consuming mode when the supply voltage decreases below a second threshold voltage.

7. The apparatus of claim 1, wherein the first processing circuitry is further configured to switch operation mode from the first active power consuming mode to the second non-active low power consuming mode when one or more predefined first user inputs are received.

8. The apparatus of claim 6, wherein the second threshold voltage is higher than the first threshold voltage.

9. The apparatus of claim 1, wherein the first processing circuitry and the wireless transmit circuitry are configured to operate in a common power off mode when the first processing circuitry is in the second non-active low power consuming mode and when the wireless transmit circuitry is in the non-active non-broadcasting mode.

10. The apparatus of claim 7, wherein the first processing circuitry and the wireless transmit circuitry are configured to operate in a common power off mode when the first processing circuitry is in the second non-active low power consuming mode and the wireless transmit circuitry is in the non-active non-broadcasting mode.

11. The apparatus of claim 10, wherein the first processing circuitry and the wireless transmit circuitry are configured to be set into the common power off mode when the first processing circuitry receives a second user input that is different than the one or more predefined first user inputs.

12. The apparatus of claim 10, wherein the first processing circuitry is configured to detect a first user setting and a second user setting, wherein the first processing circuitry is configured to switch from the first active power consuming mode to the second non-active low power consuming mode when the first processing circuitry detects the first user setting and the one or more predefined first user inputs are received, and wherein the first processing circuitry and the wireless transmit circuitry are configured to be set into the common power off mode when the first processing circuitry detects the second user setting and the one or more predefined first user inputs are received or when the first processing circuitry detects the second user setting and the supply voltage decreases below a second threshold voltage.

13. The apparatus of claim 10, wherein the first processing circuitry is configured to detect a first user setting and a second user setting, wherein the first processing circuitry is configured to switch from the first active power consuming mode to the second non-active low power consuming mode when the first processing circuitry detects the first user setting and the supply voltage decreases below a second threshold voltage, and wherein the first processing circuitry and the wireless transmit circuitry are configured to be set into the common power off mode when the first processing circuitry detects the second user setting and receives the one or more predefined first user inputs or when the first processing circuitry detects the second user setting and the supply voltage decreases below a second threshold voltage.

14. The apparatus of claim 11, wherein the first processing circuitry is configured to detect a first user setting and a second user setting, wherein the first processing circuitry is configured to switch from the first active power consuming mode to the second non-active low power consuming mode when the first processing circuitry detects the first user setting and the one or more predefined first user inputs are received, and wherein the first processing circuitry and the wireless transmit circuitry are configured to be set into the common power off mode when the first processing circuitry receives the first one or more predefined user inputs and detects the second user setting or when the first processing circuitry detects the second user setting and the supply voltage decreases below a second threshold voltage.

15. The apparatus of claim 11, wherein the first processing circuitry is configured to detect a first user setting and a second user setting, wherein the first processing circuitry is configured to switch from the first active power consuming mode to the second non-active low power consuming mode when the first processing circuitry detects the first user setting and the supply voltage decreases below a second threshold voltage, and wherein the first processing circuitry and the wireless transmit circuitry are configured to be set into the common power off mode when the first processing circuitry detects the second user setting and receives the one or more predefined first user inputs or when the first processing circuitry detects the second user setting and the supply voltage decreases below a second threshold voltage.

16. The apparatus of claim 1, wherein the wireless transmit circuitry comprises a BLUETOOTH low energy transmitter, and wherein the wireless signal is a BLUETOOTH low energy signal.

17. A method for switching operation modes in an apparatus that comprises a first processing circuit and a wireless transmit circuit that are coupled to and powered by a first battery supply, the method comprising:
    switching an operation mode of the first processing circuit from a first active power consuming mode to a second non-active low power consuming mode;
    when the first processing circuit switches operation mode from the first active power consuming mode to the second non-active low power consuming mode, operating the wireless transmit circuitry in an active broadcasting mode in which the wireless transmit circuitry broadcasts a wireless signal; and
    operating the wireless transmit circuitry in a non-active non-broadcasting mode when a supply voltage of the first battery supply is below a first threshold voltage.

18. The method of claim 17, further comprising operating the wireless transmit circuitry in the active broadcasting mode when the first processing circuit is in the first active power consuming mode.

19. The method of claim 17, further comprising operating the wireless transmit circuitry in the non-active non-broadcasting mode when the first processing circuit is in the first active power consuming mode.

20. The method of claim 17, further comprising managing, by the first processing circuit, switching from one operation mode to another operation mode based on one or more user selected settings.

* * * * *